Figure 1:
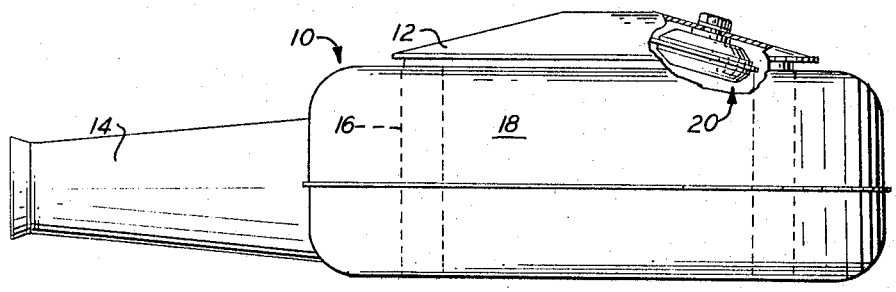

April 4, 1967  R. C. McKINLAY  3,312,187
FLUID FILTER ASSEMBLY HAVING A WARNING INDICATOR
Filed Feb. 2, 1966

ROBERT C. McKINLAY
INVENTOR.

BY John R. Faulkner
Keith L. Zirschling
ATTORNEYS

United States Patent Office 3,312,187
Patented Apr. 4, 1967

3,312,187
FLUID FILTER ASSEMBLY HAVING A
WARNING INDICATOR
Robert C. McKinlay, Dearborn, Mich., assignor to Ford
Motor Company, Dearborn, Mich., a corporation of
Delaware
Filed Feb. 2, 1966, Ser. No. 524,417
3 Claims. (Cl. 116—70)

This invention relates to a fluid filter assembly and in particular to a fluid filter assembly having a warning indicator and adapted to be used in conjunction with an internal combustion engine.

It is well known to filter the air that is mixed with fuel to form the charge for an internal combustion engine. This filtering avoids the introduction of dirt and other harmful contaminants in both the charge forming device of the engine and the engine proper. Conventionally, an air filter assembly is mounted on the air horn of the engine charge forming device. The air filter assembly is thus in direct communication with the engine intake manifold and manifold vacuum draws air through the filter assembly. Also, the intake scoop of the air filter assembly is so oriented that the air rushing into the engine compartment when the vehicle is moving enters the filter assembly. The engine fan also aids the entry of air into the filter assembly. Within the filter assembly is a continuous length of porous filter material constructed so as to allow the passage of air therethrough while filtering out dirt and other contaminants present in the air. After a period of use, this filtering material becomes clogged with dirt and the passage of air therethrough is greatly restricted. This condition prevents free breathing of the engine and greatly impairs engine operating efficiency.

Periodic maintenance must, therefore, be done to promote continued acceptable air filtering. This maintenance consists of either cleaning or replacing the filter material, depending on the particular type of filter material used.

Investigation has shown that this air filter maintenance is oft times neglected by the vehicle owner or the attending mechanic. This neglect and the corresponding clogging of the filter material lead to the entry of contaminants into the engine charge forming device and the engine itself, a decrease in engine vehicle gas mileage, a loss of power and a general deterioration of engine operating efficiency. Also, fluid filters often become covered with dirt although there is no actual impairment of filter efficiency. Replacement of the filter or other maintenance at such a time is needless and incurs added maintenance expense.

It is, therefore, a principal object of this invention to provide a fluid filter assembly having a warning indicator that positively indicates the need for fluid filter maintenance.

A further object of this invention is to provide an air filter assembly for use with an internal combustion engine having a warning indicator of simple design and ease of construction.

A fluid filter assembly constructed in accordance with this invention includes an outer shell that surrounds a filtering member. The filtering member defines an enclosure through which filtered fluid passes to the charge forming device of the engine. Mounted on the interior side of the outer shell of the filter assembly is a warning indicator, including a main body that defines a chamber. A flexible diaphragm separates the chamber into two portions. One portion of the chamber communicates with the enclosure and the other portion of the chamber communicates with the atmosphere. An indicator extends through the main body and the shell of the filter assembly and is attached to the diaphragm so that the indicator member will protrude exterior of the shell when the pressure in the portion of the chamber that communicates with the atmosphere exceeds pressure in the portion of the chamber that communicates with the enclosure by a slight, predetermined amount.

Figure 2:
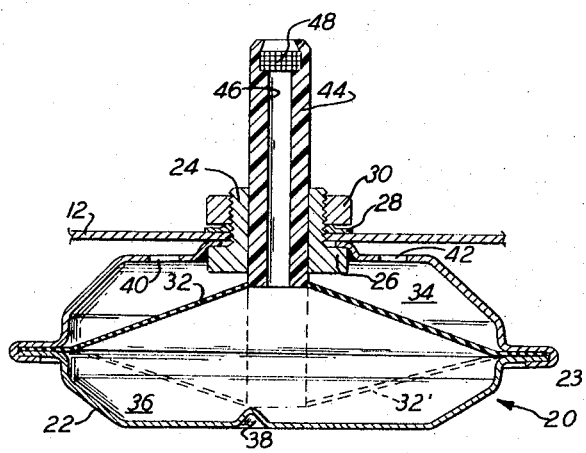

Further objects and advantages of this invention will become apparent as this description proceeds, especially when considered in conjunction with the accompanying drawings wherein:

FIGURE 1 is a side elevation view of a fluid filter assembly constructed in accordance with this invention and having parts broken away to show the warning indicator and illustrating schematically the filtering member; and FIGURE 2 is a sectioned side elevation view of the warning indicator shown in FIGURE 1.

Referring now in detail to the drawings, the numeral 10 indicates generally a fluid filter assembly having an outer shell or casing 12 and an air scoop 14. Surrounded by outer shell 12 is a continuous length of porous filtering material 16 that defines an enclosure 18 through which filtered air passes to the engine charge forming device.

A warning indicator, generally indicated by the reference numeral 20, is mounted on the inner side of shell 12. Indicator 20 comprises a main body 22 that is rigidly attached to enlarged shoulder 26 of threaded collar 24. The shank of collar 24 extends through an opening in shell 12 and is affixed thereto by means of washer 28 and nut 30. Main body 22 may be fabricated from two pieces of sheet like material as shown in FIGURE 2 of the drawings or may be a one piece member. In the particular embodiment shown in the drawings, the two members forming main body 22 are joined by deforming peripheral flanges to form a lock joint as at 23.

Dividing the chamber defined by main body 22 is an impervious diaphragm 32 which is retained and sealed about its periphery in joint 23. The diaphragm 22 is flexible and capable of movement between the position shown in FIGURE 2 and the ghost outline designated 32'. However, indent 38, formed in main body 22 prevents a complete "bottoming" of diaphragm 32 against main body 22. Indicating member 44, having a central passageway 46 axially extending therethrough, is bonded to diaphragm 32 in such a manner as to form a seal and slides in a bore formed in collar 24. Indicating member 44 is preferably made of a material having some bright color shade such as red or yellow. Screen 48 is located in passageway 44 to prevent the entry of dirt or other foreign particles into the indicating device.

It may thus be seen that the chamber defined by main body 22 is divided into two portions 34 and 36 and that these portions are sealed from each other. Portion 34 communicates with enclosure 18 by means of apertures 40 and 42 formed in main body 22. Chamber portion 36 communicates with the atmosphere by means of passageway 46 of indicating member 44. It may thus be seen that the pressure in chamber portion 34 will be the same as the pressure in enclosure 18 and atmospheric pressure will always be present in chamber portion 36.

The operation of the device is as follows. When filtering material 16 is clean, air passing through air scoop 14 passes easily through the filtering material 16 and into enclosure 18 and the pressure drop through material 16 is infinitesimal. Also, the fact that air is being forced through air scoop 14 tends to raise the pressure in enclosure 18 above atmospheric pressure. The pressure in chamber portion 34 thus is equal to or greater than pressure in chamber portion 36 and the weight of indicating member 44 cause it and diaphragm 32 to move into the position indicated by the reference numeral 32' and the top of indicating member 44 is flush with the top of collar 24.

However, as filtering material 16 becomes dirty and clogged to the point of impairing filtering efficiency, the flow of air from air scoop 14 to enclosure 18 is greatly restricted and a substantial pressure drop occurs through material 16. Since enclosure 18 is in direct communication, via the charge forming device, with the intake manifold of the engine, intake manifold vaccum will be transmitted to enclosure 18 and, of course, chamber portion 34. Under these conditions, the atmospheric pressure in chamber portion 36 will exceed the pressure in chamber portion 34 to a degree sufficient to overcome the weight of indicating member 44 and diaphragm 32 will be forced to the position shown in FIGURE 2, thus extending indicating member 44 through and above the top of collar 24. This visual indication that filter material 16 is dirty may readily be seen by the vehicle owner or by a mechanic performing maintenance on the vehicle. Appropriate maintenance steps then can be taken.

It will be understood that the invention is not to be limited to the exact construction shown and described and that various changes and modifications may be made without departing from the spirit and scope of the invention as defined in the appended claims.

I claim:
1. In a fluid filter assembly having an outer shell surrounding a filtering member through which fluid passes, said shell and said filtering member defining an enclosure, and said shell having an aperture therethrough: a warning indicator device comprising a main body defining a chamber, said main body having a top structural portion and a bottom structural portion, said top structural portion having a first aperture therethrough, a flexible diaphragmatic member separating said chamber into a first chamber portion partially defined by said top structural portion and a second chamber portion partially defined by said bottom structural portion, elongate indicating means operatively connected to said diaphragmatic member and slidably extending into said first aperture, said warning indicator device mounted in said enclosure so that said first aperture in said top structural portion is aligned with said aperture in said shell, said indicating means having an axial bore extending therethrough communicating with said second chamber portion and the atmosphere, and said top structural portion having a second aperture therethrough communicating between said first chamber portion and said enclosure.

2. Apparatus according to claim 1 wherein said structural portions of said main body comprise two opposing concave members having flanges extending around their peripheries, said concave members being joined by deformation of said flanges to form a lock joint, the periphery of said diaphragmatic member extending into said lock joint to retain and seal said diaphragmatic member.

3. Apparatus according to claim 1 including a filter positioned in said axial bore to prevent the entry of dirt into said second chamber portion.

References Cited by the Examiner
UNITED STATES PATENTS

| | | | |
|---|---|---|---|
| 1,265,676 | 5/1918 | Klump | 73—406 |
| 2,114,105 | 4/1938 | Gerber | 116—65 |
| 2,325,188 | 7/1943 | Lofgren | 55—274 |
| 2,767,851 | 10/1956 | Muller | 210—90 |
| 3,246,624 | 4/1966 | Lowther | 116—70 |

FOREIGN PATENTS

| | | |
|---|---|---|
| 345,440 | 3/1931 | Great Britain. |
| 200,857 | 11/1958 | Australia. |
| 882,165 | 11/1961 | Great Britain. |

LOUIS J. CAPOZI, *Primary Examiner.*